United States Patent [19]
Ellesson et al.

[11] Patent Number: 6,098,099
[45] Date of Patent: Aug. 1, 2000

[54] THIRD-PARTY NOTIFICATION BY NETWORK DIRECTORY SERVER

[75] Inventors: Edward James Ellesson, Apex, N.C.; Sanjay Damodar Kamat, Ossining, N.Y.; Arvind Krishna, Somers, N.Y.; Rajendran Rajan, Bronx, N.Y.; Dinesh Chandra Verma, Millwood, N.Y.

[73] Assignee: International Business Machines Corporation, Armonk, N.Y.

[21] Appl. No.: 09/063,811

[22] Filed: Apr. 21, 1998

[51] Int. Cl.[7] ............................................. G06F 13/00
[52] U.S. Cl. .......................... 709/223; 709/224; 709/226
[58] Field of Search .................................. 709/201, 202, 709/203, 217, 218, 219, 220, 223, 224, 225, 226, 230, 232, 235, 238, 240, 300; 370/229, 230, 235, 236

[56] References Cited

U.S. PATENT DOCUMENTS

| | | | |
|---|---|---|---|
| 5,434,848 | 7/1995 | Chimento, Jr. et al. | 370/17 |
| 5,870,561 | 2/1999 | Jarvis et al. | 709/238 |
| 5,968,121 | 10/1999 | Logan et al. | 709/219 |

*Primary Examiner*—Viet D. Vu
*Attorney, Agent, or Firm*—Ohlandt, Greeley, Ruggiero & Perle, LLP

[57] ABSTRACT

The present invention is a directory server for monitoring network access requests, which includes a storage device for storing data items and an identifier associated with a monitoring node for at least a selected data item of the data items; a communication device for transmitting signals to the monitoring node; and a processing device, coupled to the storage device and the communication device. The processing device receives a network access request for the selected data item and, responsive to receipt of the request, automatically transmits a signal notifying the monitoring node of the request via the communication device, thereby enabling the monitoring node, e.g., a third party, to enforce traffic class priorities and access characteristics of the network.

20 Claims, 7 Drawing Sheets

6,098,099

THIRD-PARTY NOTIFICATION BY NETWORK DIRECTORY SERVER

FIELD OF THE INVENTION

The present invention relates to the administration of quality of service (QoS) in a network and, more specifically, to a directory server for notifying a third-party in the event that directory information is accessed and/or modified by a client node of the network.

BACKGROUND OF THE INVENTION

Internet protocol (IP) networks in the present environment tend to be complex and often overloaded. Within this context, it is necessary to develop a framework for providing some level of quality of service (also referred herein as "service quality") in an IP network. A common architecture of an IP-based corporate internet includes several campus networks connected by a backbone network. The campus networks are typically high-speed local area networks (e.g., Ethernets, Token Rings, etc.) and are relatively free of congestion. The backbone network employs relatively slower links and is more susceptible to congestion and packet losses. The main cause for such performance problems is that the demand for network bandwidth often exceeds the operating capacity of the backbone network.

One approach to solve the congestion problems in the congested portions of the network is to use a reservation protocol, such as RSVP. Reservation protocols offer a service-quality on a per-connection basis, but are relatively complex to implement and require inefficient resource allocation. An alternative approach is to place specialized software components at the edge of the network whose performance needs to be monitored. The specialized software component, or the edge-device, continuously monitors network traffic characteristics and performance. If the network supports means for distinguishing among packets of differing priority, the edge-device transforms the packets flowing into the backbone network in different manners. The edge-device also permits the flow of packets into the network to occur at a specified regulated rate. The different edge-devices in the network communicate with a directory server in the network to obtain information, such as classification rules, policy rules, pacing rates and network state information. The directory server is typically an X.500 directory, which is accessed using Lightweight Directory Access Protocol (LDAP).

The edge-device obtains the rules that determine the level to which a packet belongs, by querying the directory server. The query may be made by triggers, such as the establishment of a new connection, or at periodic intervals. The packets are modified so that the routers in the backbone can determine the service level of a packet readily. The edge-devices collect statistics about the traffic flowing through them, and report the statistics to the directory server on the occurrence of triggers, such as expiration timer, or termination of a connection. They also collect performance statistics about packets that are received from the network backbone and report these statistics to the directory server. In some situations, e.g., when the network is congested, edge-devices may restrict data traffic flow across part of the network below a specific rate. The edge-device obtains the values of the regulated rate by querying the directory server.

The classification rules stored in the directory server determine what service-level will be used for packets belonging to a particular connection. The rule typically specifies source/destination IP addresses, source/destination port numbers used by TCP/UDP and the service level associated with this combination. In some networking environments, the classification rules are fairly static and configured by the network. In other cases, an application may want to update the rules when it is started and when it terminates.

The use of a directory server to manage network state offers several advantages. The directory server acts as a central administration point for network control. Devices in the network can access the information from their local directory, and also store their own information in the directory. Using a protocol such as X.500, the different directory servers regulate the distribution of data into multiple locations. Since directory access protocols offer security and authentication mechanisms, secure communication channels can be readily established.

The use of a centrally administered directory and directory server for control of network operations has some performance problems. The main concerns are enumerated below:

(1) Update Lag

An edge-device needs to maintain its classification rules consistent with the classification rules in the directory server, which is capable of storing a large number of entries (e.g., millions). In some cases, the edge-device may not be able to maintain a copy of all the rules. Instead, the edge-device may cache only a small portion of these rules. This portion depends on the current set of active applications and is likely to be dynamic. Furthermore, the rules stored in the directory server are subject to change. They may be changed by an operator, or applications may request that an update be made to enable them to operate at a specific service-level. Since a change in the rules occurs without the knowledge of the edge-device, there is latency between the time an edge-device queries the directory for the classification rules (e.g., on observing the first packet of a connection) and the time when the update occurs. Thus, the edge-device may be operating for some period using out-of-date classification rules.

(2) Server Overload

In order to facilitate improved network control, the edge-device needs to update the information maintained in the directory server about its statistics. When there are hundreds of edge-devices that need to store the information in the directory, the directory server can easily become overwhelmed with the volume of updates. Since each edge-device is operating asynchronously, it is possible for many of them to attempt to update the directory at the same time, and for some to be unable to connect for extended periods of time.

(3) Encrypted Data

When the IP payload is encrypted end-to-end using a protocol such as IP-sec, an intermediate box is unable to obtain information such as port numbers necessary to mark data. However, the intermediate box is responsible for ensuring that an untrustworthy user workstation, e.g., a directory client, is not sending improperly marked data across the network.

There is a need to address the problems of update lag, server overload and encrypted data when an intermediary edge-device is used to classify packets, and a directory server is used as the site for administration. More specifically, there is a need to ensure that an untrustworthy user workstation is not sending improperly marked data, across the network.

Accordingly, it is an object of the present invention to provide a directory server to eliminate the problems associated with update lag, server overload and encrypted data.

It is a further object of the present invention to provide a directory server, which notifies designated third-parties in the event directory information is accessed and/or modified.

Another object of the present invention is to provide a directory server, which monitors requests, such as queries or updates, by a client node.

SUMMARY OF THE INVENTION

The present invention is a directory server for monitoring network access requests, which includes a storage device for storing data items and an identifier associated with a monitoring node (e.g., a third party) for at least a selected data item of the data items; a communication device for transmitting signals to the monitoring node; and a processing device, coupled to the storage device and the communication device. The processing device receives a network access request for the selected data item and, responsive to receipt of the request, automatically transmits a signal notifying the monitoring node of the request via the communication device, thereby enabling the monitoring node to enforce traffic class priorities and access characteristics of the network. The notification may be transmitted over an existing connection with the monitoring node or, if none exists, processing device may establish a new connection with the monitoring node, via the communication device.

Such an arrangement provides a monitoring mechanism for tracking network access requests, particularly those originating from untrustworthy users, such as hackers, who attempt to alter the priority levels of message requests through the network. In such instances, the directory server can notify a third-party in charge of an occurrence of a particular network access request and other related information (e.g., origin, results, etc.). The third party need not have an existing connection with the directory server. This allows the third party to take preventive measures to maintain the priorities associated with network access requests, particularly those defined by service level agreements. Such preventive measures may include transmitting a warning message to the individual or device that is responsible for the network access request, preventing the responsible individual/device from accessing the network or any other suitable measures that will deter individuals from tampering with the priorities of message requests for the network. As such, the present invention eliminates the problems associated with update lag, server overload and encrypted data.

In the preferred embodiment, the directory server includes a directory database for storing data items (e.g., directory information) including third-party identifiers and a directory access protocol processor for receiving a request to access a selected data item(s) from client nodes and performing operations on the selected data item(s) according to the request. The directory server further includes a notification manager for monitoring the requests of directory client nodes, such as edge-devices, and notifying a monitoring node (e.g., a third party node) in the event of a request to access the selected data item(s). The notification manager is preferably arranged as an intermediate layer between the directory access protocol processor and the directory database. Such an arrangement allows the notification manager to monitor all requests received by directory access protocol processor and to notify a third party, if necessary.

The present invention also provides a directory database, which allows data items or entries stored therein to be marked for third-party notification. For instance, a selected data item may be marked with a third-party identifier(s) to require notification of third-parties indicated by the third-party identifiers if a client request modifies the selected data item. Data items can thus be marked by item, class and/or the specific operation performed on the data items as a result of the client request. The directory database may store rules to regulate the service quality of the network, such as classification rules, policy rules, pacing rules and network state information, as well as store client information, such as employee identifiers, phone, numbers, application programs, private keys, a list of the equipment in the network, a list of the properties of the network and any other type of information desired to be maintained centrally.

DETAILED DESCRIPTION OF THE INVENTION

Figure 1:
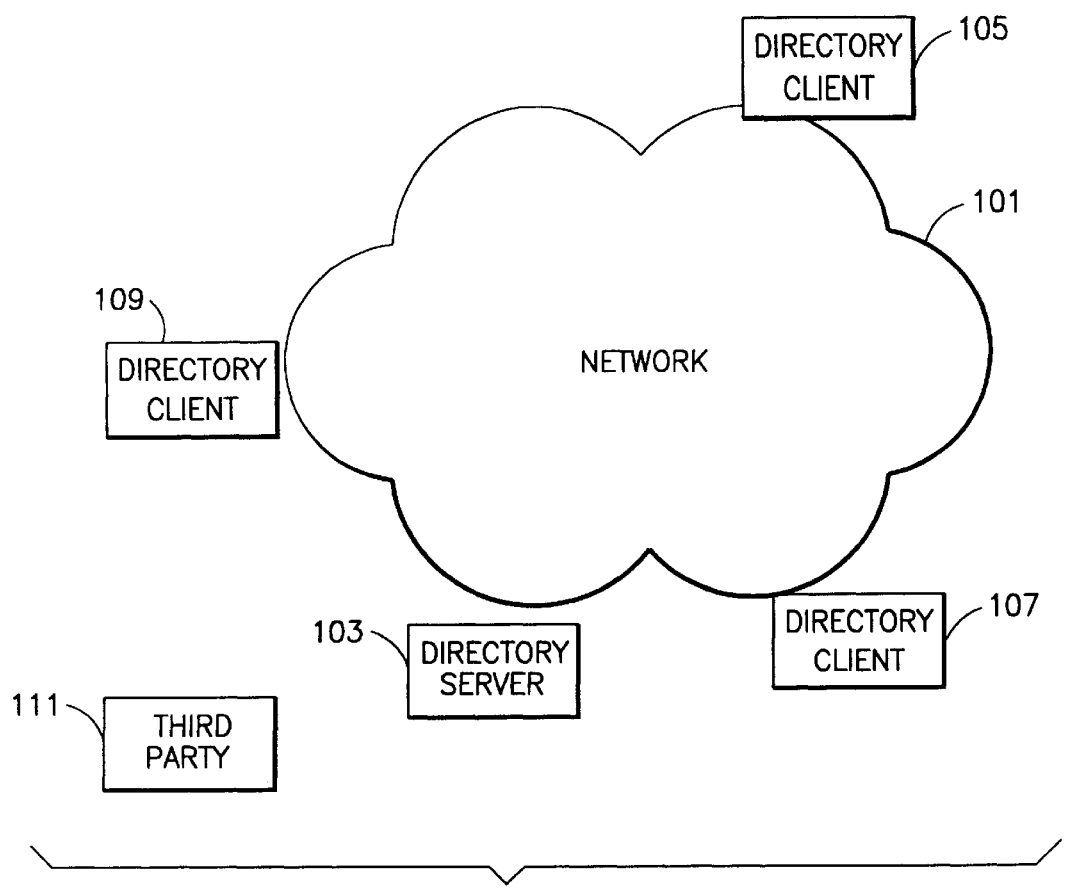
FIG. 1 illustrates a system overview of a network of the present invention.

FIG. 1 illustrates a system overview of a network 10 employing a centrally administered directory server for managing the service quality of the network environment, in accordance with the present invention. Network 10 includes a network backbone 101 connected between a plurality of network nodes. Network 10 also includes several other nodes 105, 107, 109 which act as clients (hereinafter "client (s)") of a directory server 103, such as a workstation. Client(s) 105, 107, 109 interact with directory server 103, across communication links and nodes of network 10, to regulate service quality and data transmission, across network backbone 101. Directory server 103 also notifies a designated third-party or parties, generally indicated by the reference numeral 111, upon an occurrence of a specified event, such as if directory information of directory server 103 is accessed and/or modified, specifically by an untrustworthy client of directory server 103. The incorporation of such a third-party notification feature allows third party 111 to enforce traffic class priorities and access characteristics and to ensure that an untrustworthy client is not sending improperly marked data, across network backbone 111.

That is, such an arrangement provides a monitoring mechanism for tracking network access requests, particularly those originating from untrustworthy users, such as hackers, who attempt to alter the priority levels of message requests through the network. In such instances, the directory server can notify a third-party in-charge of an occurrence of a particular network access request and other related information (e.g., origin, results, etc.). This allows the third party to take preventive measures to maintain the priority levels of message requests through the network, particularly those priority levels defined by service level agreements. Such preventive measures may include transmitting a warning message to individual/device (e.g., the sender) that is responsible for the network access request, preventing the responsible individual/device from accessing the network or any other suitable measures that will deter individuals from tampering with the priorities of message requests through the network.

The term third-party or third-party node, as used herein, generally refers to any device that is notified by the directory server upon the occurrence of a specified event. A third-party may be a local device connected to the directory server, a remote device connected to the network backbone (such as a client), or a device situated at any location, so long as the directory server can communicate with the remote device.

Figure 2:
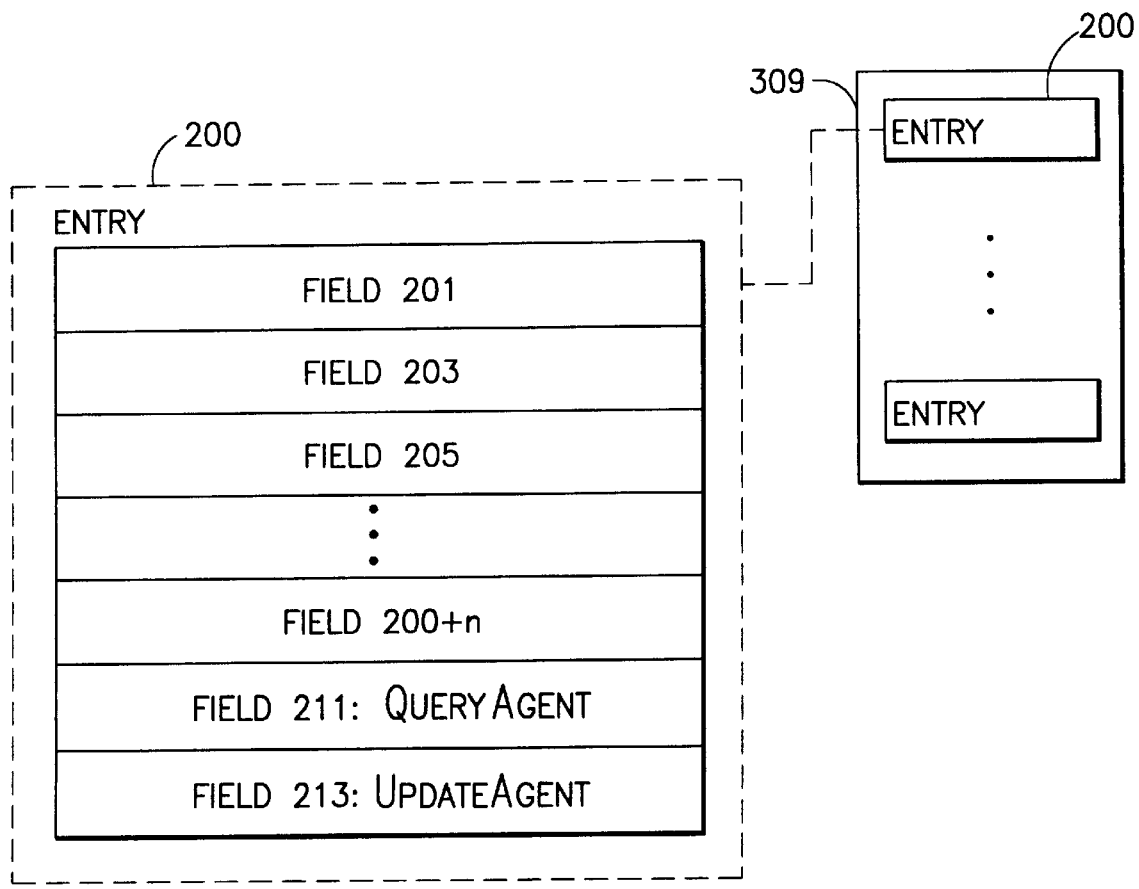
FIG. 2 illustrates a block diagram of entries of a directory database.

FIG. 2 illustrates a directory database 309 for storing directory information (also referred to as data items) in a plurality of entries 200. Each entry 200 includes multiple fields for specifying particular attributes of the directory information stored in the entry. For instance, fields 201 through 200+n can specify different properties about the entry and are representative of fields typically maintained by a state-of-the-art directory. Field 211 represents a QueryAgents field which includes a list of addresses of third parties (such as their network addresses) who need to be notified anytime a directory entry is queried by another client of directory server 103. Field 213 represents a UpdateAgents field which includes a list of addresses of third parties (such as their network addresses) who need to be notified anytime a directory entry is altered, i.e., updated or deleted, by another client of the directory. In addition, directory server 103 may also mark some of the entry classes in directory database 309 as being monitored. When a class is designated for monitoring, directory server 103 notifies the registered directory client(s) of any actions taken in the specified entry class, such as whenever a new entry belonging to the class is created.

Although each entry of directory database 309 is shown as including a QueryAgents field and a UpdateAgents field, each entry may include any number and type of fields to specify other types of situations or operations on a entry which would require notification of a third arty node. As can be appreciated, the fields of selected entries or a class of entries can be employed as a marking mechanism to mark at least selected entries of directory database 309 for third-party notification or monitoring. Such entries can thus be marked by entry, fields of entry, entry class and/or the occurrence of a specific event (e.g., update request or query request).

It should also be understood that the information stored in QueryAgents field and a UpdateAgents field may instead be stored as separate entries or in any other suitable arrangement so long as the information can be readily accessed.

Directory information stored in directory database 309 may include network regulating rules, such as classification rules, policy rules, pacing rules, general network state information, client statistics, and/or any other type of information necessary to regulate the service quality of a network. The directory information may also include client information, such as employee identifiers, phone numbers, application programs or pathways to access such application programs, private keys, a list of the equipment in the network, a list of the properties of the network, or any other type of centrally maintained information.

Figure 3:
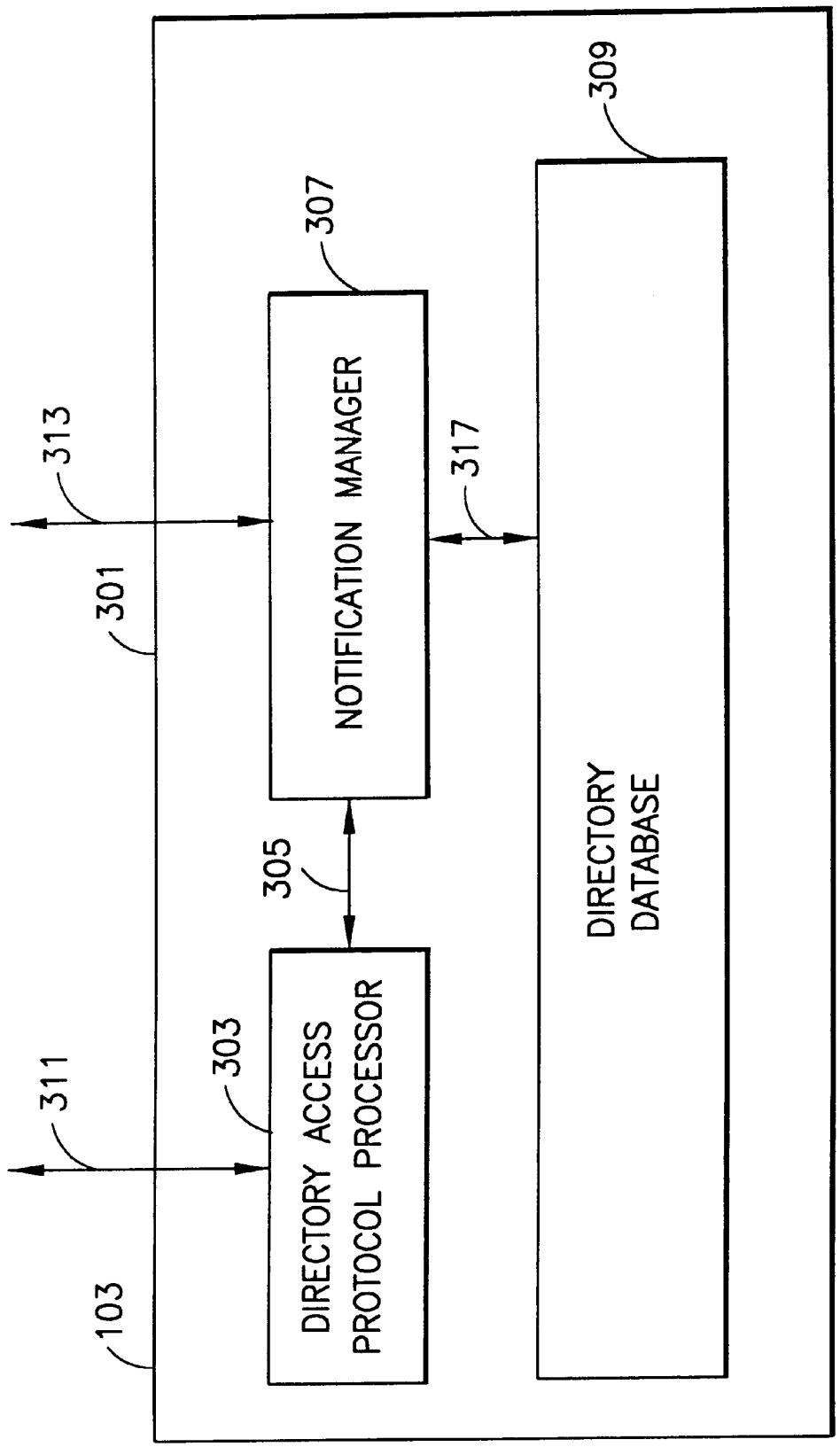
FIG. 3 illustrates a block diagram of a directory server which performs third party notification in accordance with the present invention.

FIG. 3 illustrates a block diagram of the components of directory server 103 which includes two components found in standard directory servers, namely an access protocol processor 303 and the directory database 309 (as described in FIG. 2). Directory access protocol processor 303, connected to network backbone 101 via an interface 311, is responsible for communicating with directory clients. Directory access protocol processor 303 employs known directory access protocols, such as Lightweight Directory Access Protocol (LDAP) to communicate with directory clients. Directory access protocol processor 303 converts requests from a client into directory database access requests, according to a protocol which is associated with database 309, such as Sequential Query Language (SQL).

Directory database 309 stores directory information (as described above) preferably in a manner shown in FIG. 2. Directory database 309 may be a database, such as DB2 (a trademark of IBM) or Oracle (a trademark of Oracle Corporation). Other commonly used databases can also be employed as the backends of directory server 103. The protocol employed by directory access protocol processor 303 to access and modify (i.e., update, delete or create a new entry) directory database 309 is generally known in the art and will not be described in further detail herein.

Directory server 103 further includes a notification manager 307 which is responsible for monitoring specified activities at directory server 103 and notifying a designated third-party upon the occurrence of the specified event through the use of a communication protocol extension or communication means generally denoted by reference numeral 313. Notification manager 307 is preferably arranged as an intermediate layer between directory access protocol processor 303 and directory database 309 to monitor incoming requests received by directory access protocol processor 303. Notification manager 307 interacts with directory database 309 using a database-specific protocol 317 which is identical to the protocol 305 used by directory access protocol processor 303 to communicate with directory database 309. Such protocols are generally known in the art and will not be discussed in further detail herein.

Figure 4:
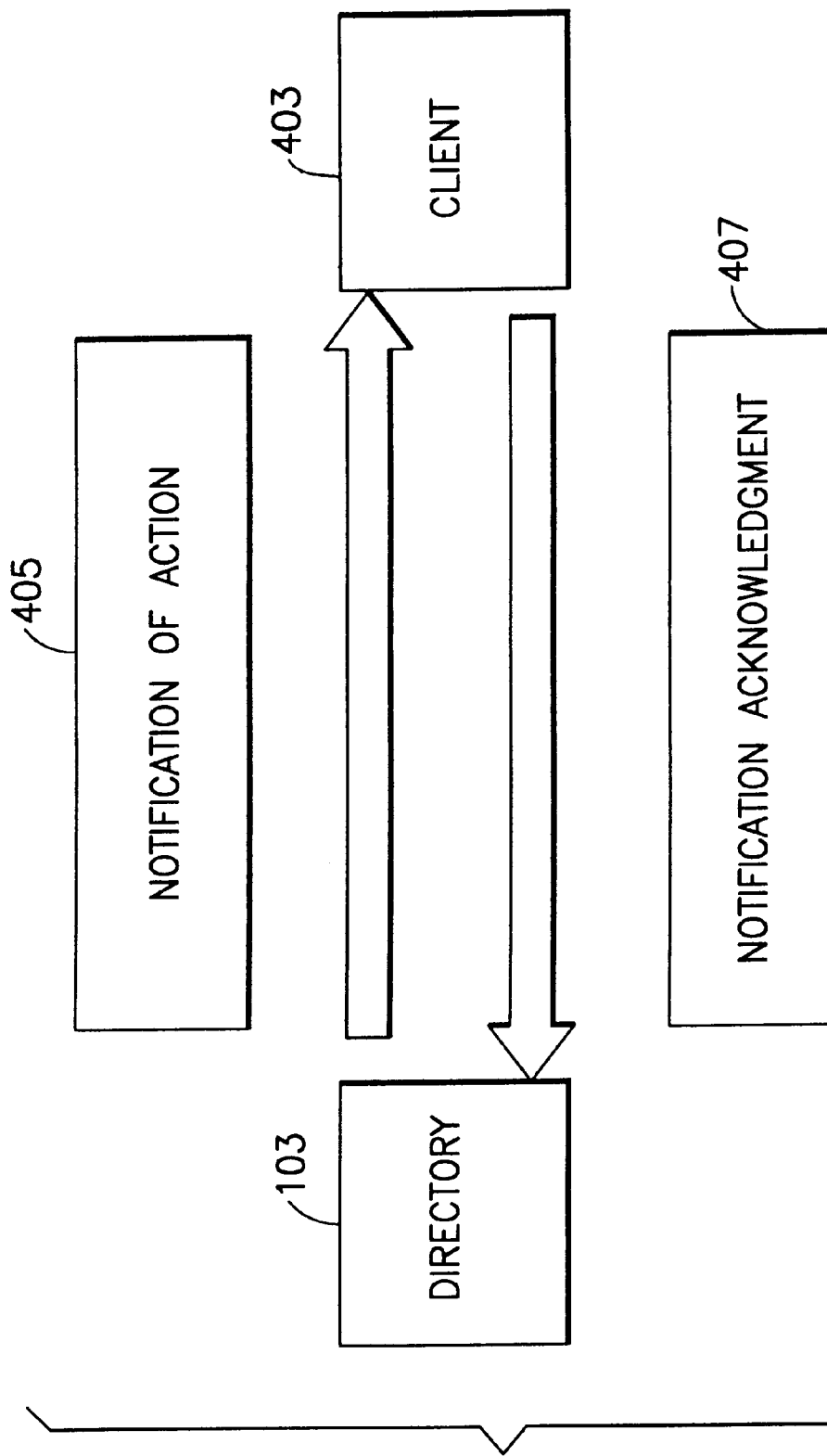
FIG. 4 illustrates a first embodiment in which the directory server of FIG. 3 interacts with clients to facilitate third party notification.

FIG. 4 illustrates an embodiment of an algorithm employed to perform third-party notification between directory server 103 and clients (e.g., generally indicated by reference numeral 105, 107 and 109 in FIG. 1). When directory server 103 detects an operation on an entry which requires third-party notification, directory server 103 establishes a new connection to a third party 403 to be notified, and sends a notification message 405 informing monitoring node 403 about the triggering event.

Notification message 405 preferably includes an identity of the directory client accessing directory database 309, the type of operation requested by the directory client (i.e., update, deletion, query or addition), and the results of the operation. In response to notification message 405, third party 403 transmits a reply 407 indicating successful receipt of the notification message, or unsuccessful receipt of the notification message (e.g., an occurrence of an error).

Figure 5:
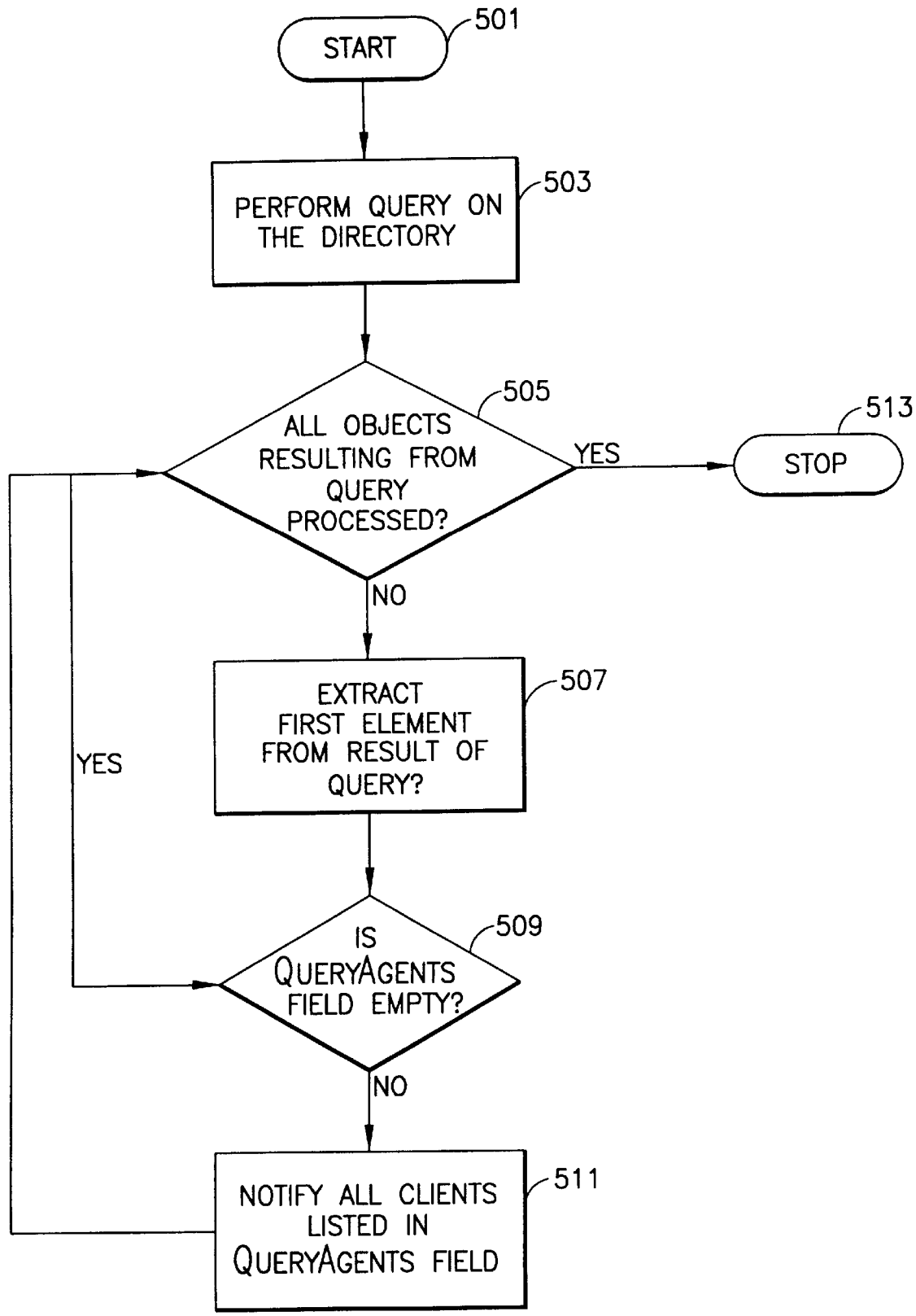
FIG. 5 illustrates a flow diagram for implementing a third party notification upon a directory update request by a client of the directory server of FIG. 3.

FIG. 5 describes a flow diagram for performing a query on a directory entry of directory database 309. The process is initiated in step 501 when a query message is received by directory access protocol processor 303, and passed onto notification manager 307. Notification manager 307 performs the query on directory database 309 in step 503, and obtains a resulting list of entries (or objects) as a response to the query. Notification manager 307 then processes these entries in a loop, shown and described by steps 505, 507, 509 and 511 of FIG. 5. Step 505 verifies if the processing has been done for all entries resulting from the query. If so, the query process is terminated in step 513. Otherwise, an entry from the list of entries is extracted in step 507. In step 509, notification manager 307 checks to determine whether QueryAgent field 211 in the entry has been satisfied. If field 211 is empty or not specified, notification manager 307 continues with the loop at step 505. Otherwise, in step 511, notification manager 307 notifies all third parties listed in QueryAgent field 211 that a query was made to the specified entry.

Figure 6:
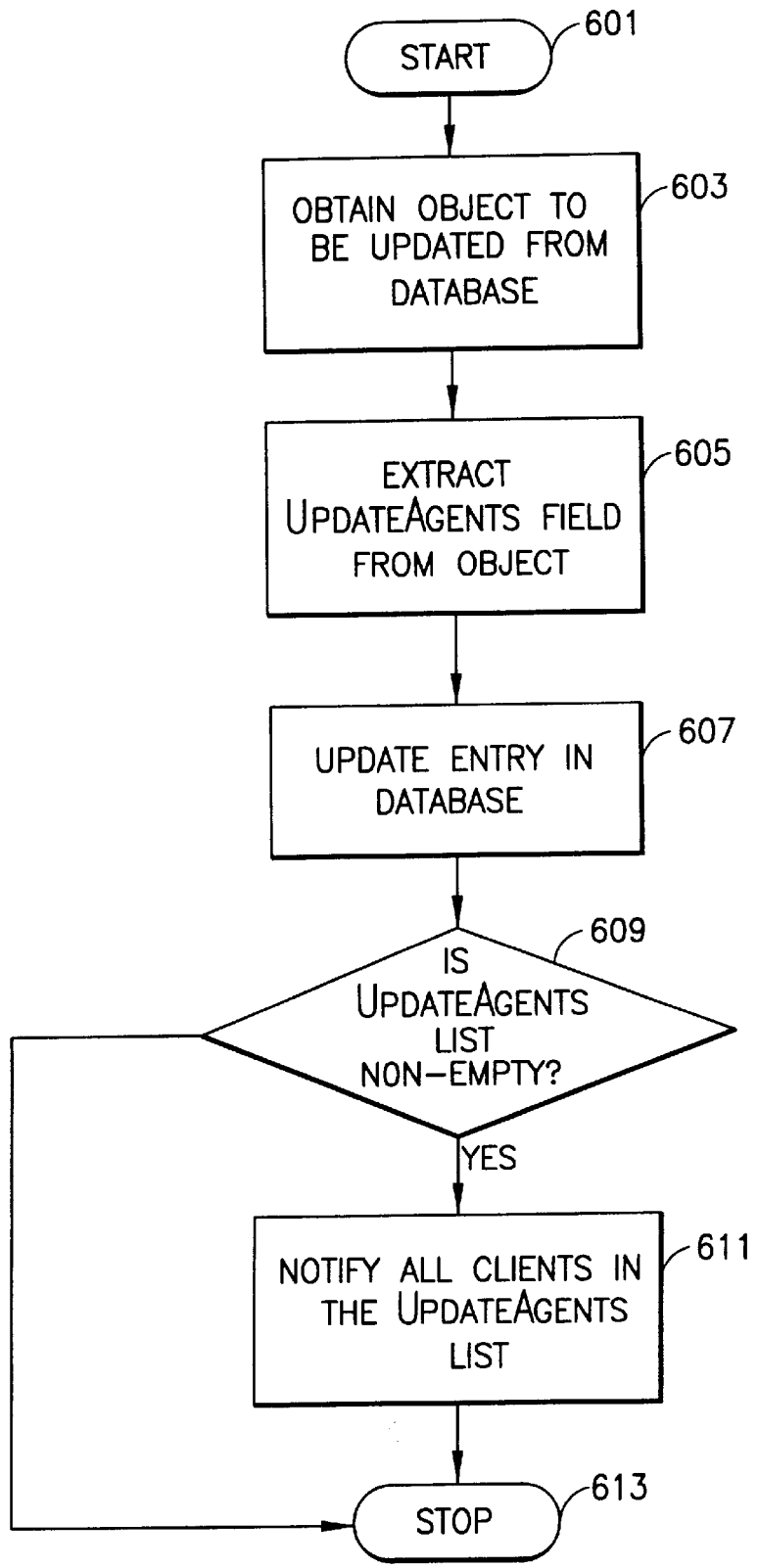
FIG. 6 illustrates a flow diagram for implementing a third party notification upon a directory query request by a client of the directory server of FIG. 3.

FIG. 6 illustrates a flow diagram for updating a directory entry of directory database 309. The process is entered in step 601 when an update message or request is received by directory access protocol processor 303, and passed onto notification manager 307. Notification manager 307 accesses directory database 309 to obtain the original entry that is to be updated in step 603, and then retrieves a list of UpdateAgents from UpdateAgents field 213 of directory database 309 in the original entry in step 605. Notification manager 307 then updates the entry in step 607. Notification manager 307 checks if the UpdateAgents list in UpdateAgents field 213 is not empty in step 609, and if so, transmits a notification message to notify all third-parties enumerated in that list in step 611. The notification message preferably includes the identity of the client requesting the update operation, and the results of the update. Once the notification message is transmitted, the process terminates in step 613. It is important to note that the determination of the UpdateAgents list is performed prior to the actual update of the entry, since the update may modify this field.

Figure 7:
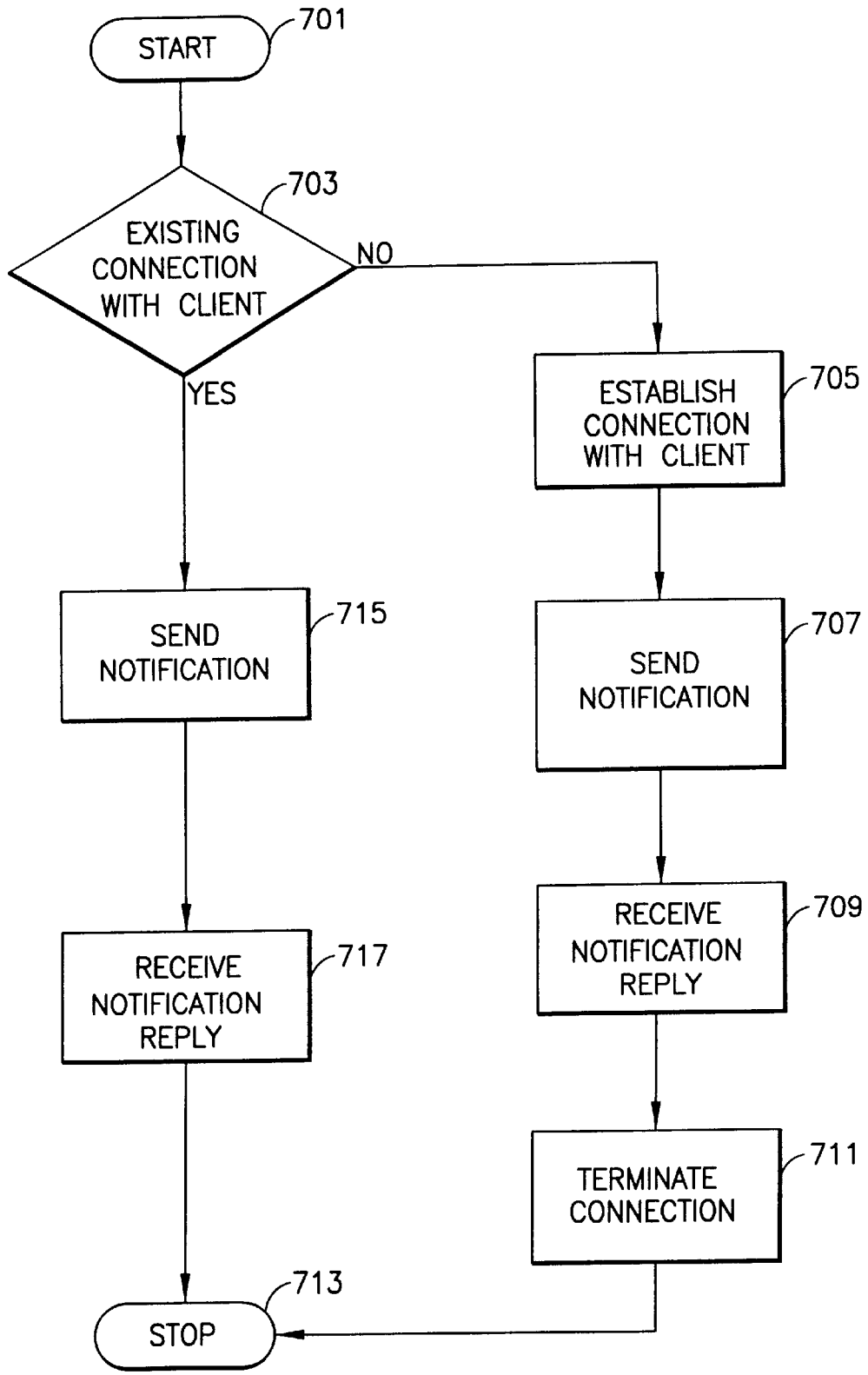
FIG. 7 illustrates a flow diagram for implementing third party notification of a single directory client of in accordance with the present invention.

FIG. 7 describes a flow diagram of an operational example performed by directory server 103 to notify a third-party as a result of step 609 or 511 of FIGS. 6 and 5, respectively. The process beings at step 701. In step 703, directory server 103 checks whether a connection already exists with the third party. If not, in step 705, directory server 103 establishes a new connection with the third party. Then in step 707, directory server 103 sends an update notification message to the third party. The third party replies with an acknowledgment of the receipt of the notification message in step 709. After this step, the connection is terminated in step 711, and the process ends in step 713. If a connection already exists in step 703, directory server 103 can send the notification message on the existing connection as indicated in step 715 and receive an acknowledgment in step 717. Thereafter, the process terminates in step 713.

The invention having thus been described with particular reference to the preferred forms thereof, it will be obvious that various changes and modifications may be made therein without departing from the spirit and scope of the invention as defined in the appended claims.

What is claimed is:

1. A directory server for monitoring network access requests, said directory server comprising:
   (a) storage means for storing data items, said storage means further storing an identifier of at least a selected data item of said data items, wherein said identifier is further associated with a monitoring node;
   (b) communication means for transmitting signals to said monitoring node; and
   (c) processing means, coupled to said storage means and said communication means, for receiving a request for said selected data item and, responsive to receipt of said request, for automatically transmitting a signal for notifying said monitoring node of said request via said communication means, thereby enabling said monitoring node to enforce traffic class priorities with respect to said selected data item wherein said identifier comprises a network address of said monitoring node, said processing means notifying said monitoring node through the use of said network address, via said communication means.

2. The directory server as recited in claim 1, wherein said processing means includes an access protocol processor for receiving said request and a notification processor for notifying said monitoring node in response to said request for said selected data of said storage means.

3. The directory server as recited in claim 1, wherein said access protocol processor is coupled to said storage means, across said notification processor.

4. The directory server as recited in claim 1, wherein said signal identifies an origin of said request.

5. The directory server as recited in claim 1, wherein said signal identifies a result of said request on said selected data item.

6. The directory server as recited in claim 1, wherein said request is a query pertaining to said selected data item.

7. The directory server as recited in claim 1, wherein said request requires said selected data to be modified.

8. The directory server as recited in claim 1, wherein said processing means receives said request across the network.

9. The directory server as recited in claim 1, wherein said data items include network regulating rules selected from the group consisting of policy rules, pacing rules, general network state information and classification rules.

10. The directory server as recited in claim 1, wherein said data items include client information.

11. The directory server as recited in claim 1, wherein said processing means causes said signal to be transmitted over an existing connection with said monitoring node.

12. The directory server as recited in claim 1, wherein said processing means establishes a new connection with said monitoring node, via said communication means, and transmits said signal to said monitoring node over said new connection.

13. A network system including a network backbone connected between the directory server of claim 1 and at least one client node, said client node transmitting said request to the directory server.

14. A directory server for monitoring network access requests, said directory server comprising:
   (a) storage means for storing data items, said storage means further storing an identifier of at least a selected class of data items of said data items, wherein said identifier is associated with a monitoring node;
   (b) communication means for transmitting signals to said monitoring node; and
   (c) processing means, coupled to said storage means and said communication means, for receiving a request to create a data item in said selected class of data items and, responsive to receipt of said request, for automatically transmitting a signal for notifying said monitoring node of said request via said communication means, thereby enabling said monitoring node to enforce traffic class priorities with respect to said selected class of data items;

wherein said identifier comprises a network address of said monitoring node, said processing means notifying said monitoring node through the use of said network address, via said communication means.

15. The directory server as recited in claim 14, wherein said data items includes network regulating rules selected from the group consisting of policy rules, pacing rules, general network stat information and classification rules.

16. A method for monitoring network access requests comprising the steps of:

a) storing data items and an identifier of at least a selected data item of said data items, said identifier being associated with, and comprising a network address of, a monitoring node;

b) receiving a request for said selected data item of data items; and c) responsive to receipt of said request, for automatically transmitting a signal to said monitoring node to notify said monitoring node of said request, accessing said identifier for said selected data item and notifying said monitoring node through the use of said network address, thereby enabling said monitoring node to enforce traffic class priorities with respect to said selected data item.

17. The method as recited in claim 16, wherein the step (c) includes the step of converting said request to an access request for accessing said storage means.

18. The method as recited in claim 16, wherein said data items include network regulating rules selected from the group consisting of policy rules, pacing rules, general network stat information and classification rules.

19. The method as recited in claim 16, wherein said signal is transmitted to said monitoring node over an existing connection with said monitoring node in the step (c).

20. The method as recited in claim 16, wherein the step (c) includes the steps of establishing a new connection with said monitoring node, via said communication means, and transmitting said signal to said monitoring node over said new connection.

* * * * *

UNITED STATES PATENT AND TRADEMARK OFFICE
CERTIFICATE OF CORRECTION

PATENT NO. : 6,098,099
DATED : August 1, 2000
INVENTOR(S) : Elleson et al.

It is certified that error appears in the above-identified patent and that said Letters Patent is hereby corrected as shown below:

Claim 18, line 11, delete "stat" and insert --state--

Signed and Sealed this

Fifteenth Day of May, 2001

Attest:

NICHOLAS P. GODICI

Attesting Officer     Acting Director of the United States Patent and Trademark Office